(12) United States Patent
Vidar

(10) Patent No.: US 11,097,664 B2
(45) Date of Patent: Aug. 24, 2021

(54) LOAD CARRIER

(71) Applicant: Thule Sweden AB, Hillerstorp (SE)

(72) Inventor: Joachim Vidar, Vaggeryd (SE)

(73) Assignee: Thule Sweden AB, Hillerstorp (SE)

( * ) Notice: Subject to any disclaimer, the term of this patent is extended or adjusted under 35 U.S.C. 154(b) by 0 days.

(21) Appl. No.: 17/042,683

(22) PCT Filed: Mar. 1, 2019

(86) PCT No.: PCT/EP2019/055208
§ 371 (c)(1),
(2) Date: Sep. 28, 2020

(87) PCT Pub. No.: WO2019/197077
PCT Pub. Date: Oct. 17, 2019

(65) Prior Publication Data
US 2021/0046881 A1 Feb. 18, 2021

(30) Foreign Application Priority Data

Apr. 11, 2018 (EP) .................................... 18166762

(51) Int. Cl.
*B60R 9/058* (2006.01)
*B60R 9/055* (2006.01)
(Continued)

(52) U.S. Cl.
CPC .............. *B60R 9/058* (2013.01); *B60R 9/055* (2013.01); *B60R 9/08* (2013.01); *B60R 9/10* (2013.01); *B60R 9/12* (2013.01)

(58) Field of Classification Search
CPC .......... B60R 9/058; B60R 9/08; B60R 9/048; B60R 9/055; B60R 2011/0043; B60R 2011/0059; F16B 2/10; F16B 2/12
See application file for complete search history.

(56) References Cited

U.S. PATENT DOCUMENTS

| | | | | |
|---|---|---|---|---|
| 5,275,320 A | * | 1/1994 | Duemmler | B60R 9/045 224/319 |
| 5,419,479 A | * | 5/1995 | Evels | B60R 9/045 224/309 |

(Continued)

FOREIGN PATENT DOCUMENTS

| | | |
|---|---|---|
| CN | 206049528 U | 3/2017 |
| CN | 206544502 U | 10/2017 |

(Continued)

OTHER PUBLICATIONS

International Search Report and Written Opinion of the International Searching Authority in International Application No. PCT/EP2019/055208, dated Mar. 26, 2019 (11 pages).

(Continued)

*Primary Examiner* — Brian D Nash
(74) *Attorney, Agent, or Firm* — Sterne, Kessler, Goldstein & Fox P.L.L.C.

(57) ABSTRACT

An attachment device for a load carrier includes a housing, a first attachment member, a second attachment member, an actuation member, and a locking system. The first and second attachment members apply a clamping force to an elongate member (such as a cross bar of a roof rack) between the first attachment member and the second attachment member. The actuation member is configured to apply a closing force to the first attachment member and is maneuverable from an open position to a closed position. The locking system is configured to resiliently accumulate a portion of the closing force when the closing force applied to the actuation member or the first attachment member exceeds a predefined load, regardless of the size of the elongate member but within a range of motion of the first and second attachment members, during the transition from its open position to its locked position.

20 Claims, 12 Drawing Sheets

(51) Int. Cl.
*B60R 9/08* (2006.01)
*B60R 9/10* (2006.01)
*B60R 9/12* (2006.01)

(56) References Cited

U.S. PATENT DOCUMENTS

| | | | | |
|---|---|---|---|---|
| 5,556,221 | A * | 9/1996 | Brunner | F16B 7/0493 |
| | | | | 403/322.4 |
| 5,769,292 | A * | 6/1998 | Cucheran | B60R 9/045 |
| | | | | 224/319 |
| 7,637,405 | B2 | 12/2009 | Emmerling et al. | |
| 8,393,508 | B2 * | 3/2013 | Sautter | B60R 9/055 |
| | | | | 224/325 |
| 8,496,145 | B2 * | 7/2013 | Sautter | B60R 9/048 |
| | | | | 224/315 |
| 8,651,349 | B2 * | 2/2014 | Meissner | B60R 9/055 |
| | | | | 224/319 |
| 9,381,866 | B2 * | 7/2016 | Sautter | B60R 9/048 |
| 10,543,771 | B2 * | 1/2020 | Sautter | E04H 15/06 |
| 10,576,903 | B2 * | 3/2020 | Rodriguez | B60R 9/10 |
| 10,676,037 | B2 * | 6/2020 | Schactman | F16B 2/10 |
| 10,773,655 | B1 * | 9/2020 | Chang | B60R 9/058 |
| 2004/0155081 | A1 * | 8/2004 | Settelmayer | B60R 9/055 |
| | | | | 224/319 |
| 2006/0012096 | A1 * | 1/2006 | Geldert | B60R 9/08 |
| | | | | 269/203 |
| 2007/0007316 | A1 * | 1/2007 | Witczak | B60R 9/042 |
| | | | | 224/310 |
| 2008/0034561 | A1 * | 2/2008 | Emmerling | B60R 9/055 |
| | | | | 24/514 |
| 2011/0139841 | A1 * | 6/2011 | Sautter | B60R 9/10 |
| | | | | 224/324 |
| 2013/0292436 | A1 * | 11/2013 | Hubbard | B60R 9/058 |
| | | | | 224/321 |
| 2016/0184978 | A1 | 6/2016 | Roesch et al. | |
| 2017/0080872 | A1 | 3/2017 | Schactman et al. | |
| 2019/0232881 | A1 * | 8/2019 | Aftanas | B60R 9/052 |
| 2019/0291653 | A1 * | 9/2019 | Brochier | B60R 9/048 |

FOREIGN PATENT DOCUMENTS

| | | |
|---|---|---|
| WO | 2004/067326 A2 | 8/2004 |
| WO | 2006/007813 A1 | 1/2006 |
| WO | 2010/148011 A1 | 12/2010 |
| WO | 2018/005944 A1 | 1/2018 |

OTHER PUBLICATIONS

Chinese Patent Search Record issued in Chinese Application No. 201980024729.3, dated Mar. 27, 2021, 3 pages.
Chinese Office Action issued in Chinese Application No. 201980024729.3, dated Apr. 6, 2021, 8 pages.

* cited by examiner

LOAD CARRIER

FIELD OF INVENTION

An attachment device for a load carrier comprising, a support housing comprising a support surface configured to face an elongate member, a first moveable attachment member and a second attachment member.

BACKGROUND

Vehicle roof racks are often used to expand the load carrying capability of vehicles, such as cars, when the user is in need of increased space for baggage, bicycles or other types of loads that may not fit into the vehicle of the user. Roof racks are widely used, and vehicles are often provided with attachment areas where the roof racks may be attached to the vehicle, where the roof rack often comprises a pair of load carrying foots, that are coupled to each other via a load carrying bar, where the load carrying bar allows the user to attach specific accessories, such as bicycle mounts, roof boxes or other types of load carriers to the vehicle.

In order to ensure the safety of the roof rack and the load carrier, the load carrier is securely attached to the roof rack via attachment members where the load carrier may be provided with adapter kits that fit a certain type of load carrying bars, having a size and form to fit the specific type of load carrying bar. Often these adapter kits are attached to the load carrying bar via cumbersome attachment means, where the securing may require tools such as a screw driver, or where the securing may be done with a rotatable handle that infers torque to the adapter to secure it in place. This means that the attachment and removal of the load carrier may be time consuming, which means that the user may defer from attaching or detaching the load carrier from the vehicle, due to the work needed to position the load carrier to the vehicle.

Another fixing device for affixing a roof box to a roof rack, may be seen in WO 2006/007813 A1 which relates to a fixing device for fixing a roof box on cross-bars that are fastened on a vehicle roof. Said fixing device comprises two-armed clamping jaws that extend through the bottom of the roof box and can be braced. Said clamping jaws are mounted on a support base fixed in the interior of the roof box in a manner so as to pivot about a stationary swivelling axis.

Thus, there is a need for a quick and easy way to attach a load carrier to e.g. a load carrying bar, where the amount of work needed can be reduced and the adaptability of the attachment member may be adjusted to multiple sizes and forms of load carrying bars, while maintaining a good and secure attachment between the load carrier and the load carrying bars.

GENERAL DESCRIPTION

In accordance with the invention, there is provided an attachment device for a load carrier comprising: a support housing comprising a support surface configured to face an elongate member, such as a cross bar or a load carrying bar of a roof rack, a first attachment member moveably connected to the housing and a second attachment member connected to the housing, the first and the second attachment members being configured for gripping and applying a clamping force to the elongate member, an actuation member connected to the first moveable attachment member and being configured to apply a closing force to the first attachment member, where the actuation member is manoeuvrable from an open position to a closed position, a locking system connected to at least one of the first moveable attachment member, the second attachment member and/or the actuation member, wherein the locking system is configured to resiliently accumulate a portion of the closing force when the closing force applied to the actuation member and/or the first attachment member exceeds a predefined load during the transition from its open position to its locked position.

Within the meaning of the invention, the open position and the closed position may also be seen as being an unlocked position and/or a locked position, respectively, where the positions may be seen as a position where the attachment device is capable of receiving an elongated part, a load carrying bar or similar structures of a roof rack and where the attachment device is secured to the elongated part, the load carrying bar or similar structures of the roof rack, respectively.

The provision of the moveable attachment member means that the attachment device may be adjusted in size to fit a plurality of load carrying bars, as the moveable attachment member can be manoeuvred into position to grip the member which it is to be attached to before the attachment device begins to apply force from the attachment member and e.g. the load carrying bar. When the first attachment member has come into contact with the load carrying bar, the load carrying bar hinders the attachment member in being manoeuvred further using a certain amount of force applied to the actuation member, and the force is transferred to the locking system, where the locking force is accumulated in the locking system up to a predefined limit, until the locking system goes into its locked position so that the force applied to the actuation member is transferred to the attachment member to apply a closing force in order to secure the attachment device to the load carrying bar. When the actuation member has been moved sufficiently, the locking system ensures that the first attachment member is fixed in its closed position while the actuation member is in its locked position.

The second attachment member provides the attachment device with an opposite attachment member to the first attachment member, so that the load carrying bar positioned in between the two member is fixed in its position relative to the first and second attachment members.

The locking system may comprise auto-adjusting compensating means for the clamping force applied to the elongate member by the first and second attachment members. The auto-adjusting compensating means may be arranged to adjust the clamping force such that the clamping force is the same for elongate members having different thicknesses.

The support housing may be a stationary support housing and the stationary housing may have a main extension in a first plane and the first and second attachment members may have a main extension in a second plane. Such arrangement may for example be suitable for fixing a roof box on load carrying bars fastened on a vehicle roof. The attachment members may then extend through to bottom of the roof box and grip the load carrying bars and thereby fix the roof box to the bars.

The first and second attachment members may be connected to the housing in parallel planes such that a respective grip end portion of the first and second attachment members overlap each other in a closed position. Such arrangement provides the attachment device with a greater flexibility in terms of the dimensions of the elongate members to be gripped and clamped while maintaining a secure clamping.

Within the scope of the present invention, the attachment device may also be utilized as an attachment member, that attaches a load to a load carrier, such as an attachment member that allows a bicycle to be attached to a load carrier, e.g. directly or indirectly via an intermediate attachment member, such as a support assembly which may be attached to the load carrier.

In one embodiment the locking system may also be configured to fix the position of at least the first attachment member when the actuation member is in its closed position.

The locking system may operate in such a manner that if the force required to manoeuvre the actuator and/or the first attachment member is below a certain level, the force is too low to activate the locking system, and the force is transmitted directly to the first attachment member to manoeuvre the first attachment member into its optimal position abutting the load carrying bar. When the first attachment member has reached its position abutting the load carrying bar, the first attachment member is prevented from moving by the load carrying bar, and the force applied to the actuation member is increased as the locking system activates its resilient absorptive member, so that when the resilient absorptive member has absorbed a predefined amount of force from the actuation member, the locking system engages from an open position to a locked position, so that any further force applied to the actuation member is transferred to the first attachment member, ensuring that the first attachment member receives enough force to secure the attachment device to the load carrier. Thus the locking system allows a force applied to the actuation member to be transitioned from the first attachment member and to the locking system in order to fix the position of the first attachment member and subsequently transitioning any further force back to the first attachment member in order to provide the necessary fixing force to fix the attachment device to the load carrying bar.

By having a resilient locking system that is configured to adapt to the force applied to the first attachment member, the first attachment member may be manoeuvred into any position, within its range of motion, into contact with the load carrying bar and thereby adapting to the size of the load carrying bar. Thus, as the locking system only begins its transition from its open position to its locked position, when the force applied to the actuation member exceeds a predefined level, and does not react when the force is below this predefined level. Thus, the locking system does not react to the manoeuvring of the first attachment member when it is being manoeuvred into its position, but only reacts when the first attachment member comes into contact with the load carrying bar, and where an increased force is required to apply more force to the first attachment member via the actuation member.

In one embodiment the locking system comprises a linkage which is pivotally connected to the locking system at a first end, such as to a wedge member of the locking system, and pivotally connected to the actuation member at a second end. The linkage may be in the form of an arm that attaches to a part of the actuation member and is adapted to transfer force from the actuation member and towards the locking system via the linkage. The linkage may on one end be attached to a part of the actuation member that is distal from the proximal end and proximal to the distal end, and/or on the opposite end being connected to the locking system. Preferably the first end of the linkage is configured to apply the portion of the closing force to the moveable part in the second direction. Preferably the linkage has a length extending from the first end to the second end, the length of the linkage being 50 mm or more, such as 70 mm or more such as from 50 mm to 200 mm.

In one embodiment the locking system in one state is configured to transmit movement and/or force from the actuation member to the first attachment member in order to allow the first attachment member to move from its open position into direct or indirect contact with the load carrier. Thus, the actuation member may transfer a force to the first attachment member, so that the first attachment member manoeuvers and/or moves from its open position, where the first attachment member is capable of being aligned with a load carrying bar, and towards its closed position where the first attachment member secures the load carrying bar against the second attachment member and secures the attachment device to the load carrying bar.

In one embodiment the locking system in one state is configured to transmit movement and/or force from the actuation member to the locking system, while the first attachment member is stationary. When the first attachment member has been moved into abutment with the load carrying bar, the force applied to the actuation member exceeds the force required to activate the locking system, and allow the locking system to transition from an open state to a locked state.

In one embodiment the locking system comprises a first and a second juxtaposed wedge, that are slidably arranged in a cavity where the wedges are configured to be expansible and contractible in the cavity to transition between a locked state and an open state. The wedges are configured to expand in at least one dimension in so that a surface area of the first and/or the second wedge is frictionally fixed relative to at least one side wall of the cavity. When the wedges are in its locked position, they allow the force of the actuation member to be transferred directly towards the first attachment member, to increase the force applied to the first attachment member and to secure it in its position. When the wedges are in its open state, they are adapted to slide inside the cavity to a predetermined position and/or towards a predefined force applied to the wedges, where they can transition from a contracted position to an expanded position so that the wedges may fix relative to each other.

In one embodiment the locking system comprises an expansible and contractible first locking member configured to fix relative to a second locking member when the locking system is in its locked state and be translatable relative to the second locking member when the locking system is in its open state. The expansible and contractible first locking member may be provided with a resilient counter force, so that when the force applied to the locking system exceeds a certain limit, the force and the counter force are configured to initiate the expansion of the first locking member, so that its position is fixed relative to the second locking member, and thereby goes into the locking state of the locking system.

In one embodiment the locking system is articulated, hinged, and/or linked to at least one of the first moveable attachment member, the second attachment member and/or the actuation member. This means that the locking system is connected to the first or second attachment member and/or the actuation member, so that a force may be transferred from the first and/or second attachment members and/or the actuation member to the locking system.

In one embodiment the actuation member is pivotally connected to the first attachment member. The actuation member may be pivotally connected at a first end to the first attachment member. This means that the actuation member may apply a force to the first attachment member. Optionally the actuation member may be pivotally connected to the locking system as well, so that a movement of the actuation member may apply a force both to the first actuation member and the locking system. The first and the second pivotal connection may be positioned at different areas of the actuation member, so that the movement of the actuation member applies force in a different manner to both elements.

In one embodiment the first attachment member is pivotally connected to the second attachment member, where the pivotal connection is optionally a linkage, such as a link arm, that is pivotally connected to the first attachment member and pivotally connected to the second attachment member. Such linkage connection between the first and the second attachment member provides synchronized movement of the first and the second attachment members.

In one embodiment the first attachment member is pivotable and/or translatable relative to a stationary part of the attachment device. The stationary part may be a part of the housing, or may be a part of a frame, where the frame is part of the attachment device. The first attachment member may be connected in such a manner that it is capable of reducing a gap between the first attachment member and the second attachment member, where a load carrying bar is configured to be positioned in the gap. The movement of the attachment member may be a translated movement, where the first attachment member translates relative to the stationary part, or where the first attachment member pivots relative to the stationary part.

In one embodiment the second attachment member is fixed and/or moveable relative to a stationary part of the attachment device optionally where the moveable second attachment member may be pivotable and/or translatable relative to a stationary part of the attachment device. The second attachment member may be seen as being permanently fixed relative to a stationary part of the attachment device, where it provides a stationary counterforce towards the first attachment member. Alternatively, the second attachment member may be pivotable or translatable relative to the stationary part, so that both the first attachment member and second attachment member move relative to each other and/or the stationary part. Thus, the gap between the first and the second attachment member may be reduced by movement of both attachment members, and a load carrying bar may be gripped from both sides, when the actuation member is manoeuvred to its locked position.

In one embodiment the actuation member may be pivotable and/or rotatable to apply a closing force to the attachment member. The actuation member may be configured to provide a closing force via pivotable and/or a rotatable movement relative to the first actuation member, the stationary part, the housing, or any part of the attachment device. Thus the closing force may be applied via leveraging relative to the attachment device. The leveraging may occur by having the actuation member attached via a fulcrum, where a first end is attached to the first or second attachment member, and the fulcrum may be connected to the locking system. Thus, when the force applied to the fulcrum exceeds the force of the first end, the resilient locking system receives at least part of the force applied to the fulcrum, and moves into its locked state.

Optionally the support surface is a plane surface configured to rest against a load carrier surface, such as a roof box, and providing support for the load carrier attachment device.

Preferably, the first and/or the second attachment member(s) protrude(s) out from the support surface, such as in a direction being perpendicular to the support surface. Preferably the housing comprises an elongated support member comprising the support surface, wherein the first and the second attachment members extend through opening(s) provided in the elongated support member.

The load carrier attachment device may comprise a security mechanism preventing the actuation member to be moved to the closed position when the elongate member is acentric in relation to the first and the second attachment members.

The load carrier attachment device may be provided with a security engagement element, such as a hook, that engages a cooperating member in the housing, so that when the actuation member is in a closed position, the security engagement member secures the actuation member from unintentional opening.

In one embodiment the clamping force applied to the first attachment member and/or the second attachment member around the elongate member is configured to be equal to or exceed a predetermined threshold when the locking system is in its locked position, optionally where any excess closing force that is not transferred to the first and/or the second attachment member is resiliently accumulated in the locking system. Thus, it is possible to ensure that regardless of the size (thickness, width, height) of the elongate member, the attachment device is maintained at the same/similar clamping force, so that the clamping force is enough to secure the attachment device to the elongate member. As a non-limiting example, where the threshold value is set at e.g. 70 N, and the closing force used to lock the attachment device is around 100 N, a certain part of the closing force is transferred to the attachment members in the form of clamping force or maybe around 70 N, where the remaining part of the closing force, 30 N, is resiliently accumulated in the locking system.

The invention also relates to a load carrier comprising an attachment device according to any of the preceding claims, preferably a roof box, a bike carrier, a ski and/or a snowboard carrier, a roof basket, or other types of load carriers configured to be attached to a vehicle. In relation to the locking system, the locking system may comprise a biasing member connected to a movable first part of the load carrier attachment device. The movable first part may be a movable first wedge element. Optionally the locking system may comprise a second wedge element and has the first movable wedge element associated with it. The first wedge element is linearly guided on the frame, in a direction of displacement that is parallel to the longitudinal axis of the frame. The first wedge element may be arranged above the second wedge element. A guide of the first wedge element on the frame may be configured such that the height position of the first wedge element relative to a guide surface does not change. This is achieved for example by a lateral guide.

Optionally, when the locking system comprises the biasing element connected to the first movable part of the attachment device, the biasing element is configured to apply a biasing force to the movable part in a first direction. The portion of the closing force applied to the locking system may be arranged to cause the movable first part to move in a second direction when the closing force applied to the locking system exceeds the biasing force. The movable part may be configured to be fixed when reaching a position adapted to the thickness of the elongate member. Preferably, the closing force applied to the movable part increases with the thickness of the elongate member and the locking system thereby accumulates a portion of the closing force and compensates for the increased closing force needed for a thicker elongate member and auto-adjusts the clamping force to remain constant irrespective of the thickness of the elongate member, within the range of motion of the first and the second attachment member.

The first direction is different from the second direction, the first and the second directions may be opposite directions.

The biasing member in the form of a coil spring, the coil spring may have a spring force of from 120 Newton, preferably from 150 Newton, such as from 150 Newton to 200 Newton.

The locking system may comprise an adjustment member being configured to adjust the closing force needed to manoeuvre the actuation member from an open position to a closed position. The first wedge element may have a first wedge surface which is adapted to the second wedge surface and is parallel thereto. The first wedge element may have, at a position opposite the first wedge surface, an upper side via which the first wedge element is guided, for example slidably guided, on a corresponding wall of the cavity. The upper side may be oriented parallel to the underside of the second wedge element.

In an exemplary embodiment, the first wedge element is supported on the frame via a spring device. In particular, the spring device is supported on a rear wall on an end of the frame. Furthermore, the spring device, which has one or more compression springs, is fixed, or supported, on a side of the first wedge element that faces towards the rear wall.

In one embodiment the locking system may comprise a stop element arranged to engage with the movable part, such as the movable first wedge, and to lock the moveable part in a locked position. Preferably wherein the movable part is a movable wedge and the stop element is arranged to be locked in a locked position between the movable wedge and an opposing second wedge. The stop element is arranged and configured parallel to the opposing wedge surfaces and is guided parallel to the guide surface on the frame. It is guided on the base in such a manner that it is free to move and "float" in a direction of height relative to the frame. The second wedge element acts on the first wedge element via the stop element. The stop element absorbs transverse forces and transfers these to the base. Transverse movement capability of the wedge elements is thereby precluded.

A similar locking system is shown with regards to a clamp in US 2016/0184978, which is hereby included by reference.

DETAILED DESCRIPTION

Figure 1:
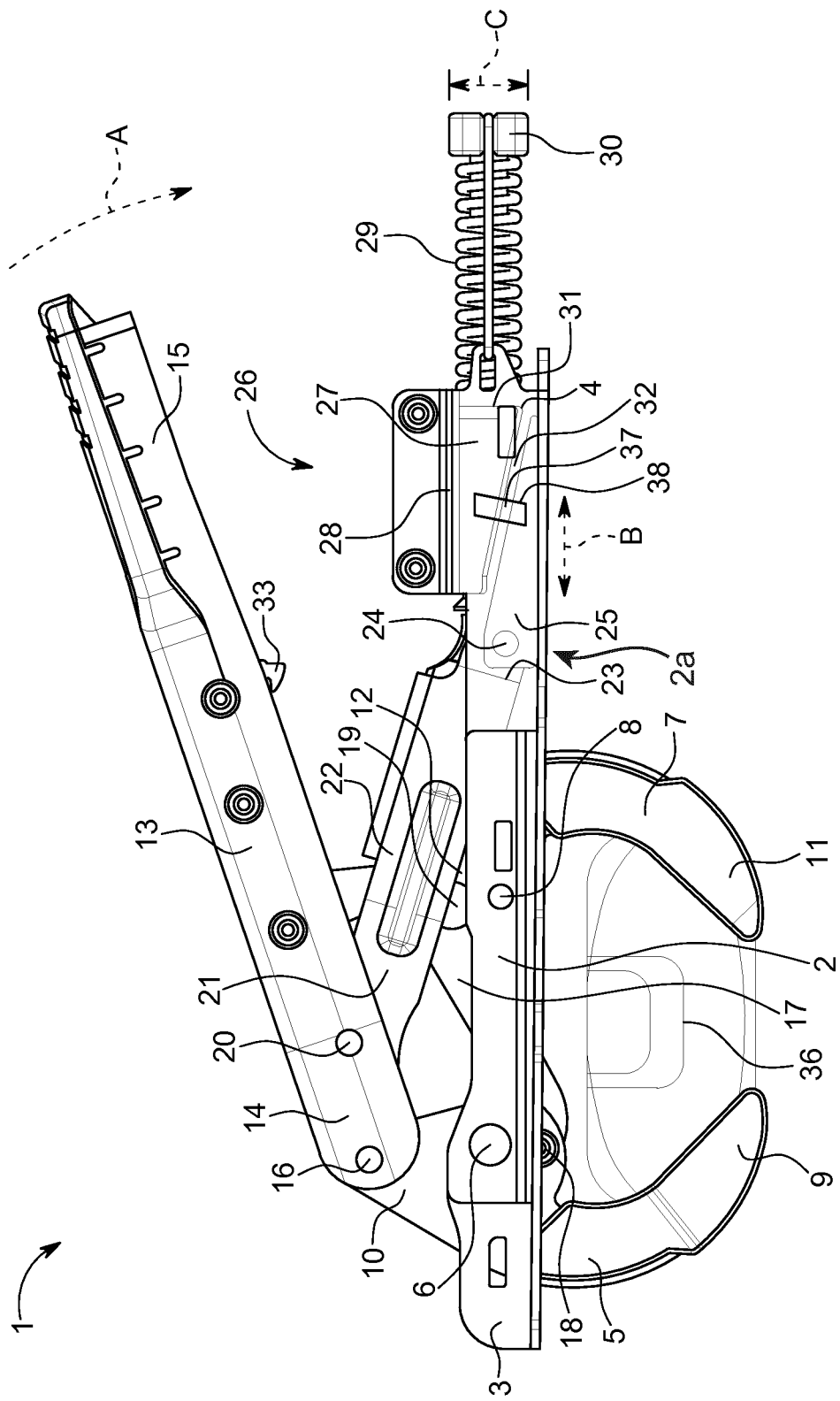
FIG. 1 shows a side sectional view of an attachment device in accordance with the invention.

FIG. 1 shows an attachment device 1 in accordance with the invention, where the attachment device comprises a rigid frame 2 (housing), where the frame 2 has a first end 3 and a second end 4. The frame comprises a first attachment member 5 that is connected via a first pivotal connection 6 to the frame 2 and a second attachment member 7 that is connected via a second pivotal connection 8 to the frame 2. The first 5 and the second attachment member 7 are provided with their respective distal ends 9, 11 and proximal ends 10, 12, that are positioned on opposite sides of the pivotal connections 6, 8.

The first attachment member 5 is connected to the second attachment member 7 via a linkage 17 which is provided with a pivotal connection 18 to the first attachment member 5 and a pivotal connection 19 to the second attachment member 4. The pivotal connection 18 on the first attachment member is provided in an area distal to the pivotal connection 6 and at an area that is proximal to the pivotal connection 8 on the second attachment member 7, so that when the first attachment member is moved towards its closed position, the linkage 17 forces the second attachment member 7 to move towards its closed position in a synchronized manner.

The attachment device 1 is further provided with an actuation member 13, having a proximal end 14 and a distal end 15, where the actuation member 13 may be seen as a handle to provide closing force to the attachment device 1. The proximal end 14 of the handle 13 is connected via a pivotal connection 16 to the proximal end 10 of the first attachment member 5 allowing a force to be applied via the actuation member 13 to the first attachment member 5. The actuation member 13 may be moved in a direction shown by arrow A from its open position to its closed position, and vice versa in the opposite direction.

The locking system 26 comprises a first wedge 27 and a second wedge 25 which are slidably arranged inside a cavity 28, which is provided in the second end 4 of the attachment device 1. The wedges may slide in the direction shown by arrow B inside the cavity 28. The first wedge 27 is connected to a biasing member 29 which provides a resilient force to the first wedge 27, so that when the first wedge 27 is slid in a direction towards the second end 4 the resilient force builds up via the biasing member 29. The biasing member 29 may be provided with an adjusting knob 30 that is adapted to adjust the resilient force which is applied to the first wedge via the biasing member 29.

The locking system 26 may be provided with a plate 32, which is disposed between the second wedge member 25 and the first wedge member 27 (second locking element), where the plate may be fixed in the directions shown by arrow B (along a longitudinal axis of the attachment device 1) but may be moved upwards and downwards inside the cavity 28 in a direction shown by arrow C (along a vertical axis of the attachment device 1).

The actuation member 13 is connected via a pivotal connection 20 to a first end 21 of a connecting element 22

(locking connector, linkage), where the opposite second end of the connecting element 22 is connected via a pivotal connection 24 to a second locking wedge 25 (first locking element), so that a force applied to the actuation member may be transferred via the connecting element 22 towards the second wedge 25 and thereby allowing the second wedge 25 to be translated inside the cavity in the direction indicated by arrow B when the actuation member is provided with a closing force or an opposite opening force.

The locking system 26 functions in such a way that when a closing force is applied to the second wedge 25, the two wedges 25, 27 have a vertical dimension (in the direction C) that is smaller than the vertical size of the cavity 28, allowing the two wedges to slide together in a directions towards the second end 4.

The attachment device is provided with a resilient member 29, that applies a resilient force to the locking system 26, which means that the two wedges 25, 27 will not slide inside the cavity until a closing force applied via the connection 22 exceeds a certain limit. This means that when the actuation member is provided with a closing force, and the first and the second attachment members 5, 7 do not encounter a significant resistance, the closing force will cause the attachment members to move freely to reduce the size of the gap 36 between the two members 5, 7. When the first and/or the second attachment members 5,7 encounter an object, such as a load carrying bar positioned in the gap 36, the two members will be prevented in moving further, which means that when the closing force is further applied to the actuator 13, the two attachment members 5, 7 will not move, but the closing force will then be applied via the connector 22 towards the locking system 26.

When the closing force applied via the connector 22 exceeds the resilient force applied via the resilient member 29 exceeds a predefined level the second wedge 25 will slide more than the first wedge 27, causing the vertical dimension of the two wedges 25, 27 to increase until the first wedge 27 is fixed relative to the cavity 28, as it is pressed in a vertical upwards direction via the slope of the second wedge 25, which causes the first wedge to become immovable in a direction towards the second end 4, which means that the closing force applied to the actuation member 13 and the connection 22 is therefore transferred directly to the first attachment member 5 and consequently also the second attachment member 7 to allow the first attachment member to increase the closing force onto the load carrying bar, which is positioned inside a gap between the first 5 and the second attachment member 7, ensuring that the closing force is enough to secure the load carrying bar between the two attachment members 5, 7.

Alternatively, the connecting element 22 may be provided with a cam member (not shown) where the cam member may be adapted to force the first wedge member in a vertical direction upwards, when the angle between the second wedge member and the connector passes a predefined value. Thus, when the angle of the connector, relative to the second wedge member passes a certain level, the cam member forces the first wedge into contact with the inner surface of the cavity 28, which thereby prevents the first wedge from sliding inside the cavity, and thereby allowing the second wedge member to stop inside the cavity, and thereby allowing the closing force to be transferred from the actuation member 13 and towards the first and/or the second attachment members.

The actuation member 13 may be provided with a hook 33 that engages a cooperating member in the frame 2, so that when the actuation member is substantially parallel to the frame, the hook 33 secures the actuation member from unintentional opening.

When the attachment device is to be opened, the actuation member is moved in a direction opposite to the arrow A, allowing the closing force to be released from the load carrying bar positioned in the gap 36, and when the closing force applied to the attachment member 5, 7 reaches below a certain level, the locking system 26 releases, as the second wedge slides relative to the first wedge in a direction towards the first end 3 of the frame 2, and thereby reducing the vertical dimension of the two wedges, and where the reduction in dimension then allows both wedges to slide simultaneously by the force applied by the resilient member to the first wedge 27 in a direction towards the first end. Subsequently the opening force applied to the actuation causes the two attachment members to open, by moving in a direction away from each other, and thereby releasing the load carrying bar, positioned in the gap.

The plate 32, positioned between the first and the second wedge 27,25 may be provided with a protrusion 37 extending outwards, where the protrusion mates with a slot 38 positioned in the frame 2, where the slot extends in a substantially vertical position, so that the protrusion allows the plate to be substantially stationary relative to the longitudinal axis of the frame 2, while allowing it to move in a vertical direction. Thus, when the two wedges are displaced in the direction B, the wedges move, while the plate is substantially stationary in the direction B. The slot may be arranged at an angle to vertical, so that the plate may move slightly in the longitudinal direction, and where the slot is substantially at a right angle to the plane of the plate 32. The slot 38 may be in the form of a pair of slots that are positioned on opposite sides of the frame 2, in order to provide a track for opposing protrusions 27 of the plate 32.

Figure 2:
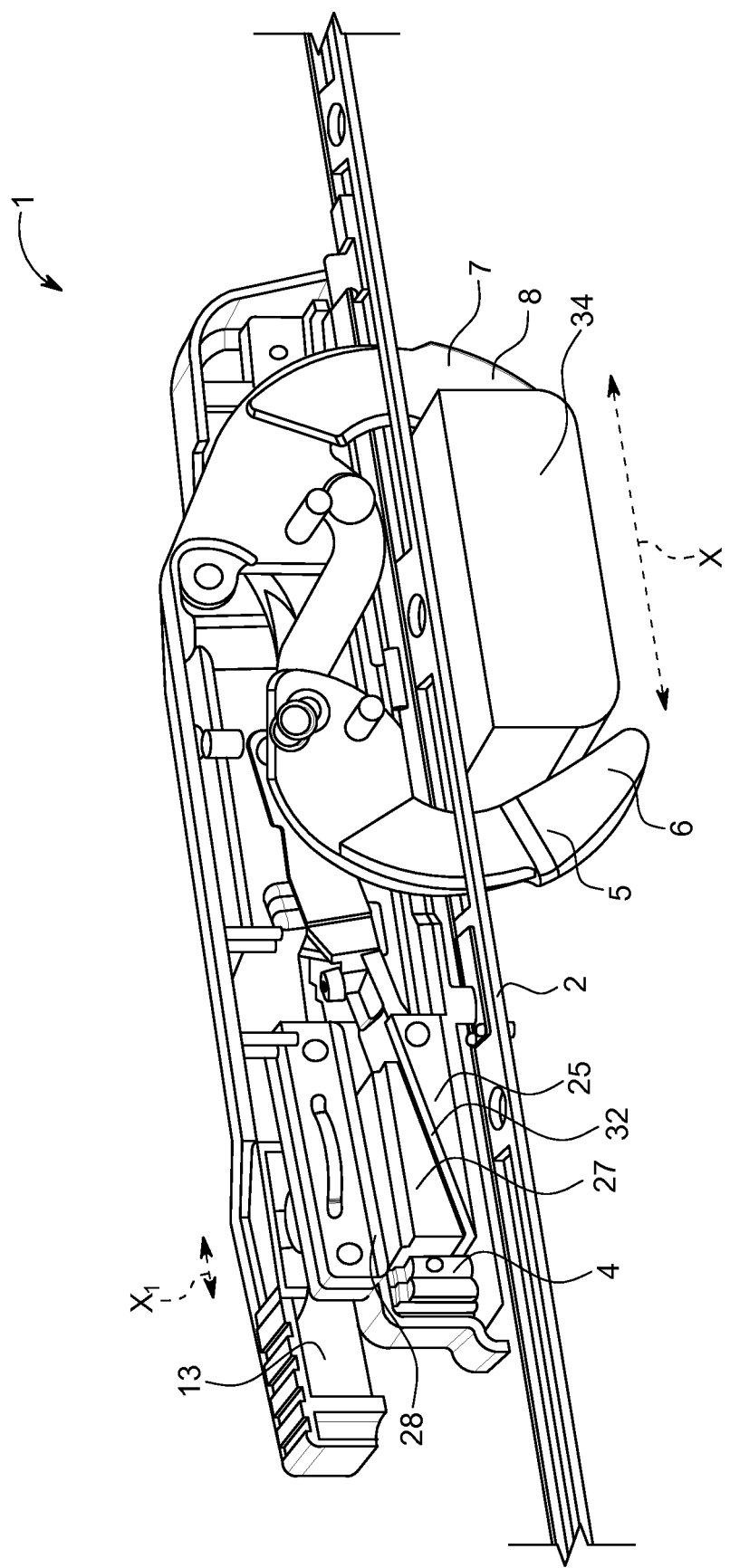
FIG. 2 shows a perspective view of an attachment device in accordance with the invention, where the attachment device is connected to a load carrying bar.

FIG. 2 shows an attachment device 1 in accordance with the invention, where the attachment device is in its locked position. The load carrying bar 34 has a relatively large dimension X, where the width of the load carrying bar means that the first and the second attachment members 5, 7, are spaced a relatively long distance away from each other, so that the distal ends of the attachment members 6, 8 are distant to each other, when they come into contact with the load carrying bar 34. It may be seen that the two wedges 25, 27 have slid a significant distance towards the distal end 4 of the frame 2, so that the wedges only lock when they have been moved into a suitable position, allowing a predefined closing force to be applied to the attachment members 5,7. This means that the attachment members come early into contact with the load carrying bar, and a part of the movement of the actuator, i.e. the closing force, goes into sliding the two wedges inside the cavity 28 towards the second end, until a predefined force and/or position is reached, to provide an increased closing force on the attachment members 5, 7.

Figure 3:
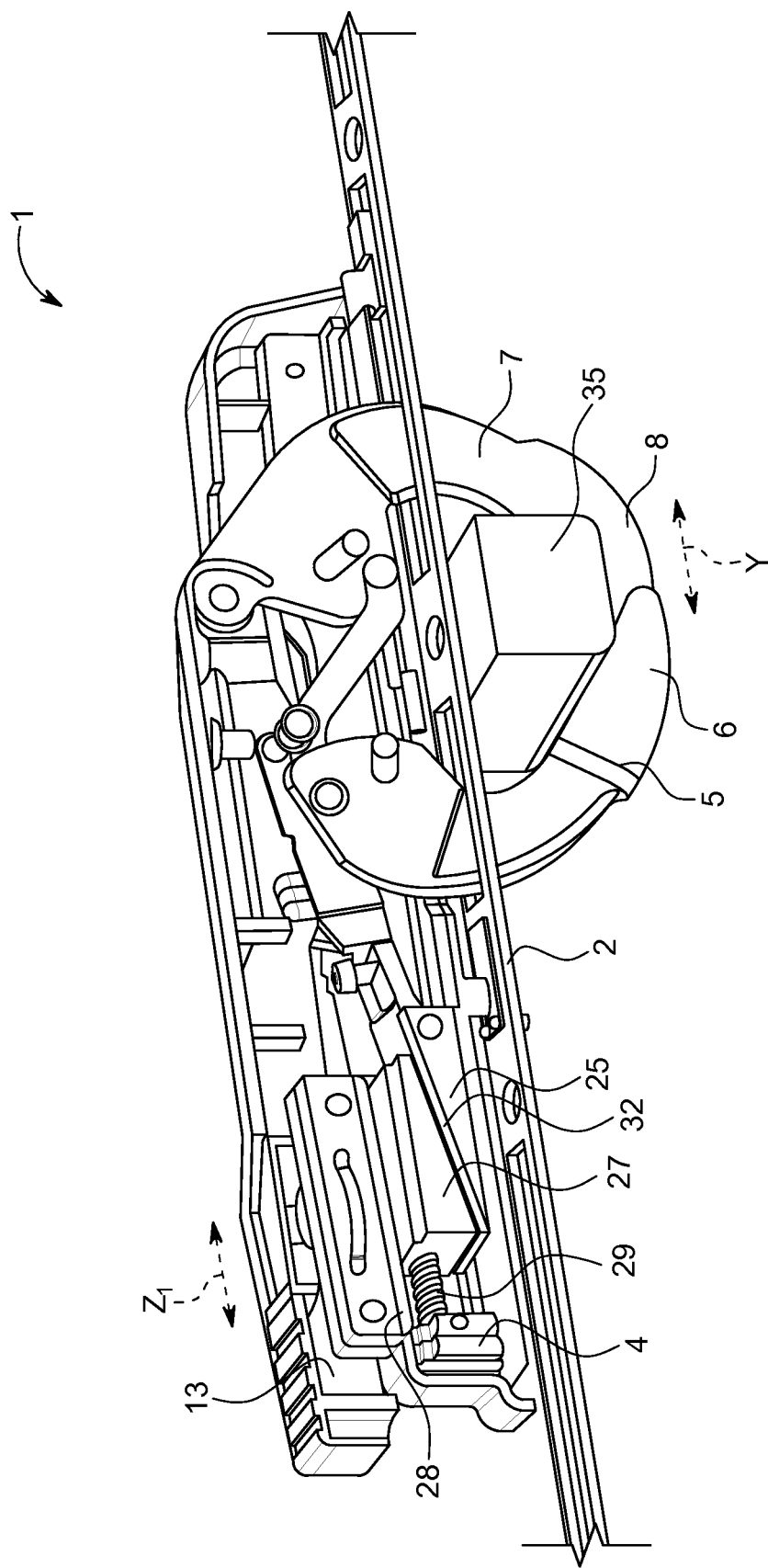
FIG. 3 shows a perspective view of the attachment device of FIG. 2 where the attachment device is connected to an alternative load carrying bar.

A different situation may be seen in FIG. 3, where the load carrying bar 35 has a smaller dimension than the load carrying bar in FIG. 2, as indicated by arrow Y, which means that the attachment members 5,7 come closer to each other, when they come into contact with the load carrying bar 35, meaning that the initial movement of the actuation member 13 is done to close the gap (between the attachment members). Thus, when the attachment members come into contact with the load carrying bar, the remaining closing force is applied to lock the locking system in its position, where it may be seen that the two wedges 25, 27 are positioned at a distance $Z_1$ from the second end 4, exposing the resilient member 29. Thus, the main movement of the actuator goes into closing the gap between the attachment members 5,7, and when they come into contact the locking system and the two wedges go into their locked mode, without sliding inside the cavity, or only sliding a minimal distance, or a shorter distance than when clamping a larger load carrying bar, such as the one in FIG. 2. The distance between the two wedges 25,27 in FIG. 2 is shown as the distance $X_1$, where the end of the first wedge is positioned relatively close to the second end 4. A load carrying bar having a size that is between the size X of FIG. 2 and Z of FIG. 3 will result in a distance from the two wedges 25, 27 that is between the length $X_1$ and $Z_1$.

Figure 4A:
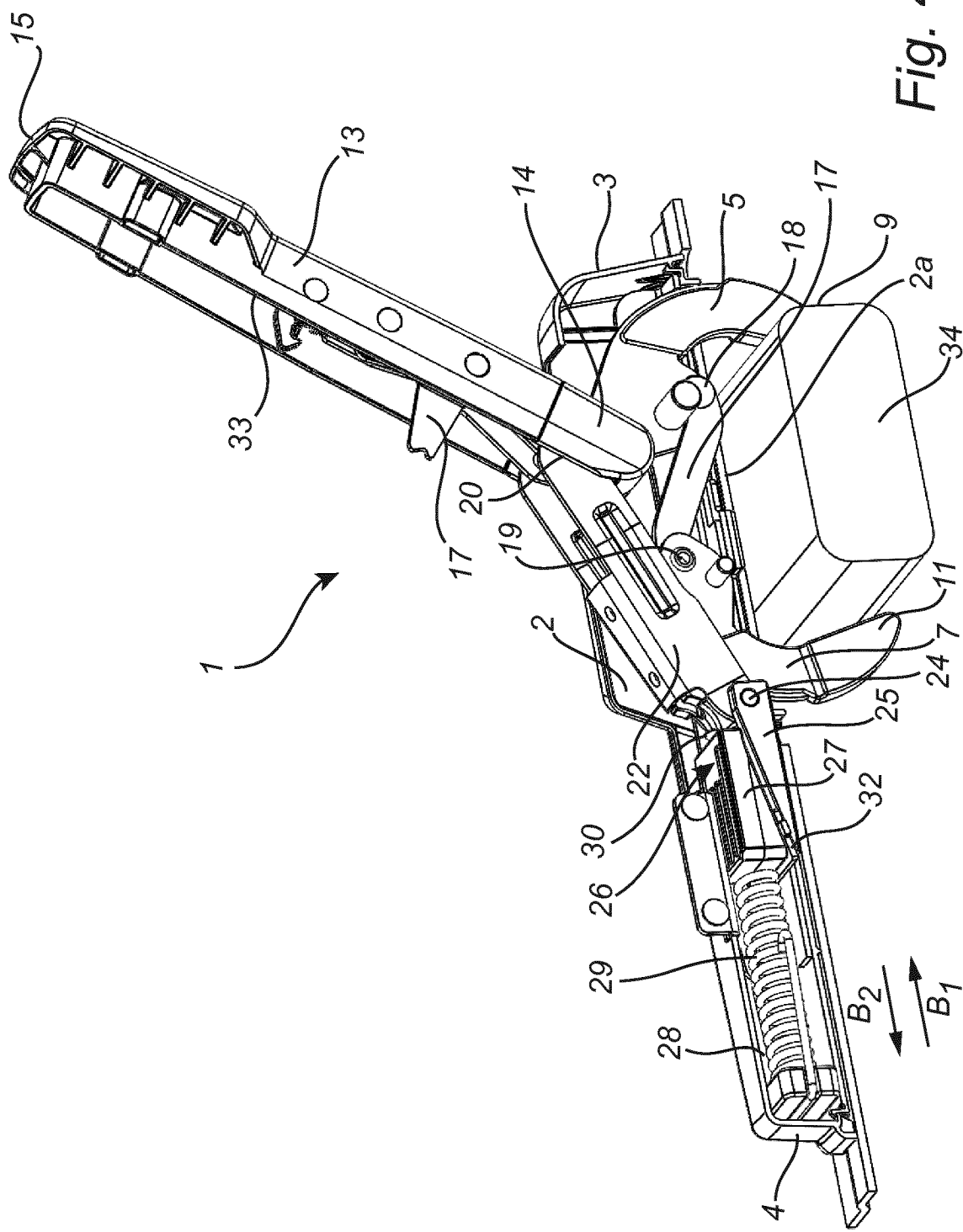
FIGS. 4*a-c* show perspective views of an attachment device according to the invention, with the attachment device gripping a load carrying bar, the attachment device is illustrated in an open position, between an opened and a closed position and in a closed position.

FIG. 4a shows an attachment device 1 according to the present disclosure. The attachment device 1 includes a support housing 2 comprising a support surface 2a configured to face an elongate member 34, here a thicker load carrying bar. The attachment device 1 further includes a first and a second attachment member 5,7, each being pivotally connected to the support housing 2. As seen in this figure, the housing 2 has a main extension in a first plane and the first and second attachment members 5,7 each have a main extension in a second plane, the first plane being essentially perpendicular to the second plane. The first and second attachment members 5,7 are configured for gripping and applying a clamping force to the elongate member 34.

An actuation member 13 is connected to the first moveable attachment member 5 and is configured for applying a closing force to the first attachment member 5. The actuation member 13 has a proximal end 14 and a distal end 15. The actuation member 13 is manoeuvrable from an open position to a closed position. In FIG. 4a, the actuation member 13 is illustrated in the fully open position. The first attachment member 5 is connected to the second attachment member 7 via a linkage 17 which is provided with a pivotal connection 18 to the first attachment member 5 and a pivotal connection 19 to the second attachment member 4.

A locking system 26 is pivotably connected to the first moveable attachment member 5 and to the proximal end 14 of the actuation member 13 via a linkage 22 in the form of an arm. The locking system 26 is at least partly arranged in a cavity 28 provided in the second end 4 of the attachment device 1. In FIG. 4a, the locking system comprises a biasing element 29, in the form of a coil spring 29, being in contact with a movable first wedge 27. The coil spring 29 is configured to apply a biasing force to the first wedge 27 in a first direction B1.

The locking system 26 furthermore includes a stop element 32 arranged between the movable wedge 27 and an opposing and movable second wedge 25. When the actuation member 13 is in the open position the biasing member 29 presses the first wedge 27 in a first direction B1 and against the second wedge 25 and the stop element 32. The stop element 32 is arranged between the first and second wedge 27,25 and is furthermore connected to the housing via a track 38 (see FIG. 8) provided in the housing in which the stop element 32 is movably arranged and slides during movement of the actuation member 13 between the open and closed position. The track 38 extends in the direction C and is slightly inclined towards the second end of the housing 2.

Figure 4B:
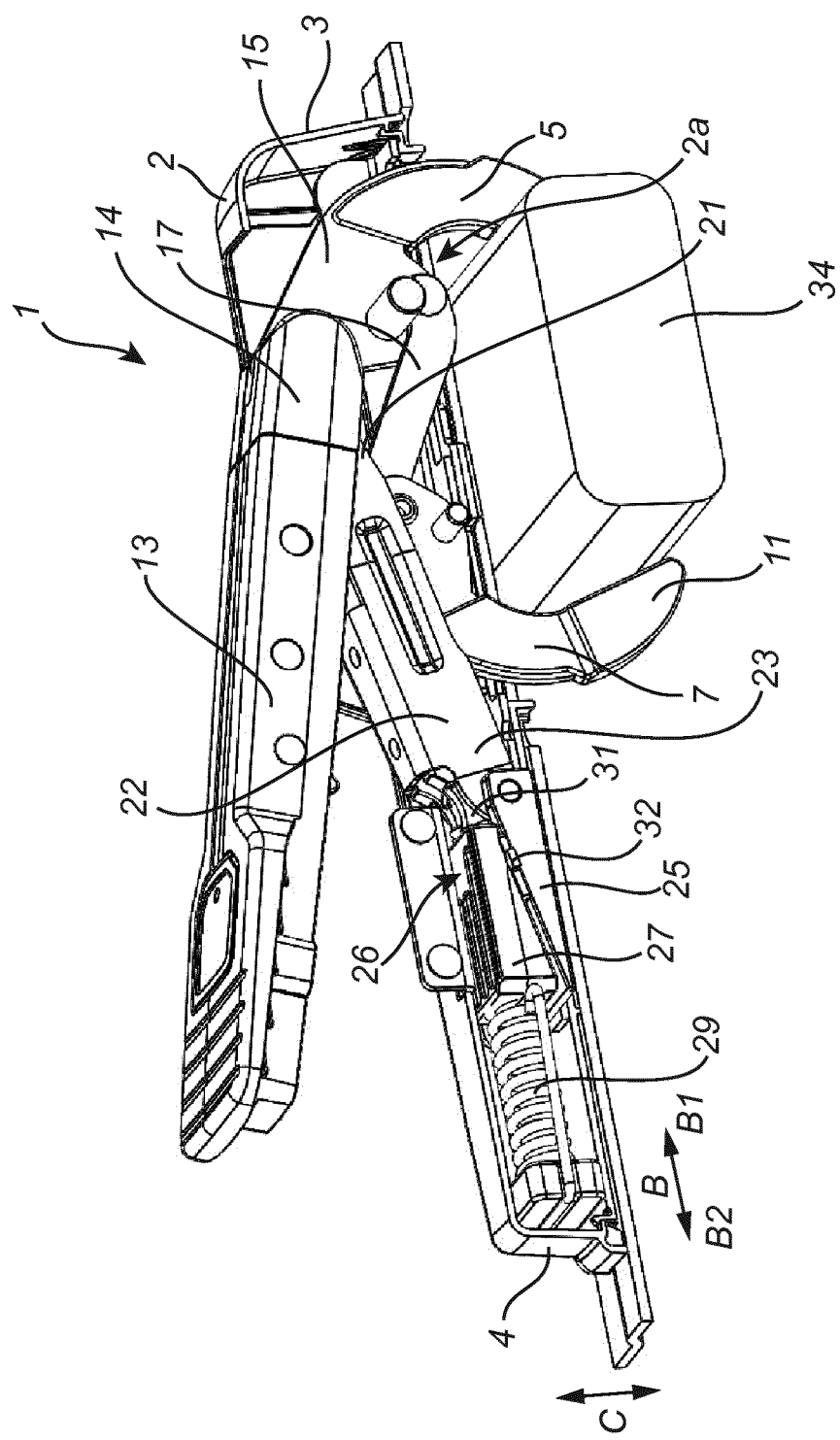

FIG. 4b illustrates the attachment device 1 according to FIG. 4a when a closing force has been applied to the actuation member 13, and the actuation member 13 has been pressed downwards and about halfway between the open position and the closed position. The proximal end 14 of the actuation member 13 is pivotally connected to a proximal end 15 of the first attachment member 5 allowing a force to be applied via the actuation member 13 to the first attachment member 5. The first attachment member 5 is connected to the second attachment member 7 via the linkage 17, so that when the first attachment member 5 is moved towards its closed position, the linkage 17 forces the second attachment member 7 to move towards its closed position in a synchronized manner. The fact that the first and the second attachment members 5,7 are connected via the linkage 17 increases the range of motion of the attachment members 5,7 and thereby the possibility to use the attachment device 1 for even larger sized elongated members.

The actuation member 13 is pivotally connected to a first end 21 of a connecting element 22 where an opposite second 23 end of the connecting element 22 is pivotally connected to a second locking wedge 25 (opposing locking wedge), so that a force applied to the actuation member 13 may be transferred via the connecting element 22 towards the opposing wedge 25 and thereby allowing the opposing wedge 25 to be translated inside the cavity in the direction indicated by arrow B2 when the actuation member 13 is provided with a closing force or an opposite opening force. A push member 31 comprising a protruding portion is connected to the linkage 17 and pushes on an adjustment member movably arranged in and protruding from an elongated lateral cavity, such as a screw hole, in the first movable wedge 27. Thereby, the connecting element 22 also applies a force to the first movable wedge 27 upon manoeuvring of the actuation member 13 from an open to a closed position, causing the movable wedge 27 to move in the second direction B2. The adjustment member 30 is movably arranged in the direction indicated by arrow B. The adjustment member 30 may be a screw which may be tightened, i.e. moved inwards in the cavity and in the first direction B1 and thereby protrude less from the movable wedge 27, and thereby decrease the clamping force of the attachment members 5,7. The adjustment member 30 may also be adjusted to increase the clamping force by moving the adjustment member 30 out from the cavity, such as by screwing, and in the first direction B1 and thereby protruding more from the elongated cavity of the movable wedge 27.

The attachment device 1 is provided with a biasing member 29, applying a resilient force to the locking system 26, which means that the two wedges 25, 27 will not slide inside the cavity until the closing force applied via the connection 22 exceeds a certain limit. This means that when the actuation member 13 is provided with a closing force, and the first and the second attachment members 5,7 do not encounter a significant resistance, the closing force will cause the attachment members 5,7 to move freely to reduce the size of the gap between the two members 5, 7. When the first and/or the second attachment members 5,7 encounter an object, such as a load carrying bar positioned in the gap, the two members will be prevented in moving further, which means that when the closing force is further applied to the actuator 13, the two attachment members 5, 7 will not move, but the closing force will instead be applied towards the locking system 26 via the connector 22.

When the closing force applied via the connector 22 exceeds the resilient force applied via the biasing member 29 exceeds a predefined level, the second wedge 25 will slide more than the first biased wedge 27 and press the first and the second wedge against the stop element 32 arranged there between. The vertical dimension of the two wedges 25, 27 will increase until the first wedge 27 is fixed relative to the cavity 28, as it is pressed in a vertical upwards direction via the slope of the second wedge 25, which, in combination with the stop element 32 arranged between the first and second wedge 27,25, causes the first wedge to become immovable in the first direction B1 towards the second end 4. This means that the closing force applied to the actuation member 13 and the connection 22 is transferred directly to the first attachment member 5 and consequently also the second attachment member 7 to allow the first attachment member to increase the closing force onto the load carrying bar 34, which is positioned inside the gap between the first and the second attachment member 5,7, ensuring that the closing force is enough to secure the load carrying bar 34 between the two attachment members 5, 7.

Figure 4C:
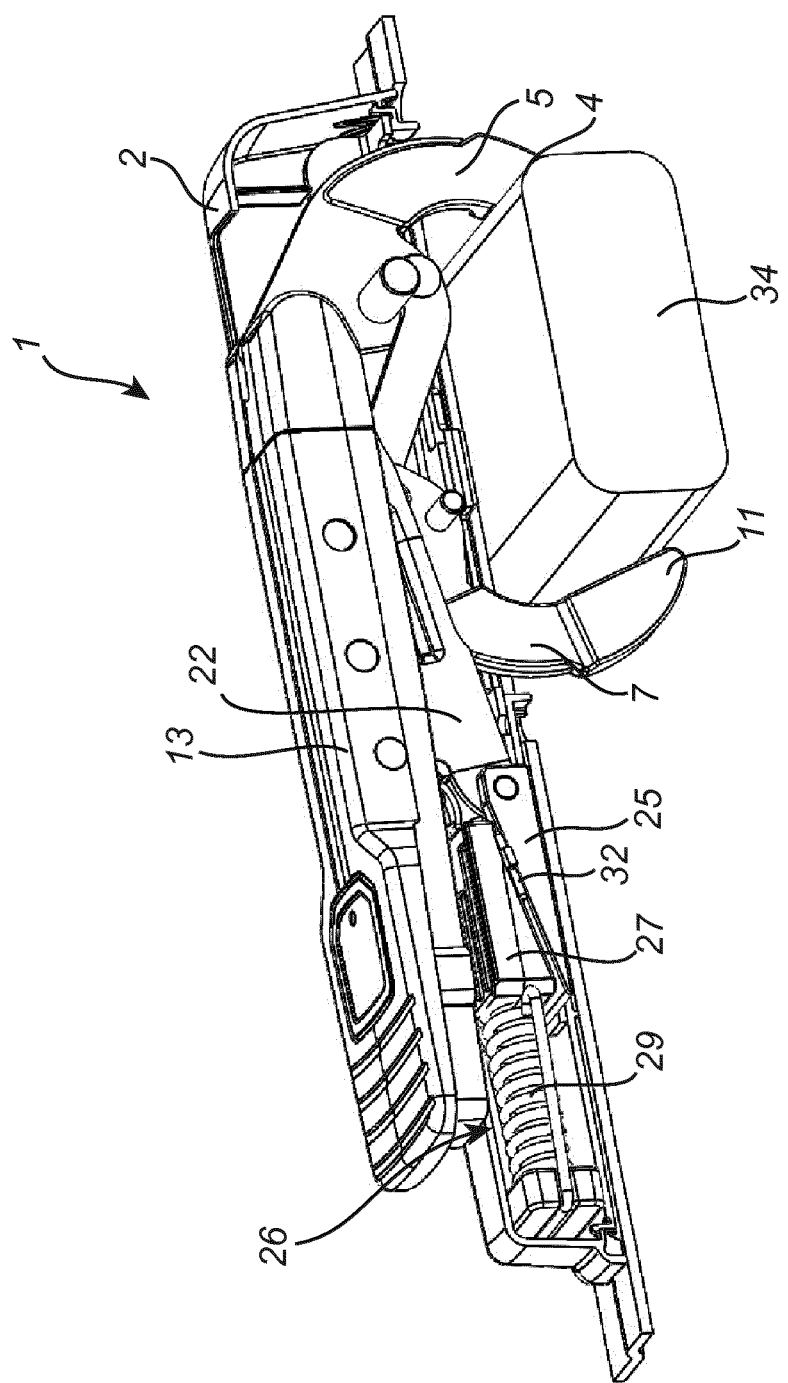

In FIG. 4C the attachment device 1 is illustrated with the actuation member (handle) 13 in a closed position and the elongate member 34 is secured with the clamping force of the first and the second attachment members 5,7. The locking system 26 comprises auto-adjusting means for the clamping force applied to the elongate member 34 by the first and second attachment members 5,7. The locking system 26 is arranged to adjust the clamping force such that the clamping force is the same for elongate members having different thicknesses. Independent of the thickness of the elongate member 34, the first and second wedges 27,25 will be brought together at the same inclination of the actuation member 13. This angle is approximately 10-12 degrees as seen in plane extending in the direction B. The closing force applied to the wedge 25,27 increases with the thickness of the elongate member. The locking system 26, including the biasing member 29, thereby accumulates an increasing portion of the closing force and compensates for the increased closing force needed for a thicker elongate member and auto-adjusts the clamping force to remain constant irrespective of the thickness of the elongate member, within the range of motion of the first and the second attachment member.

Figure 5A:
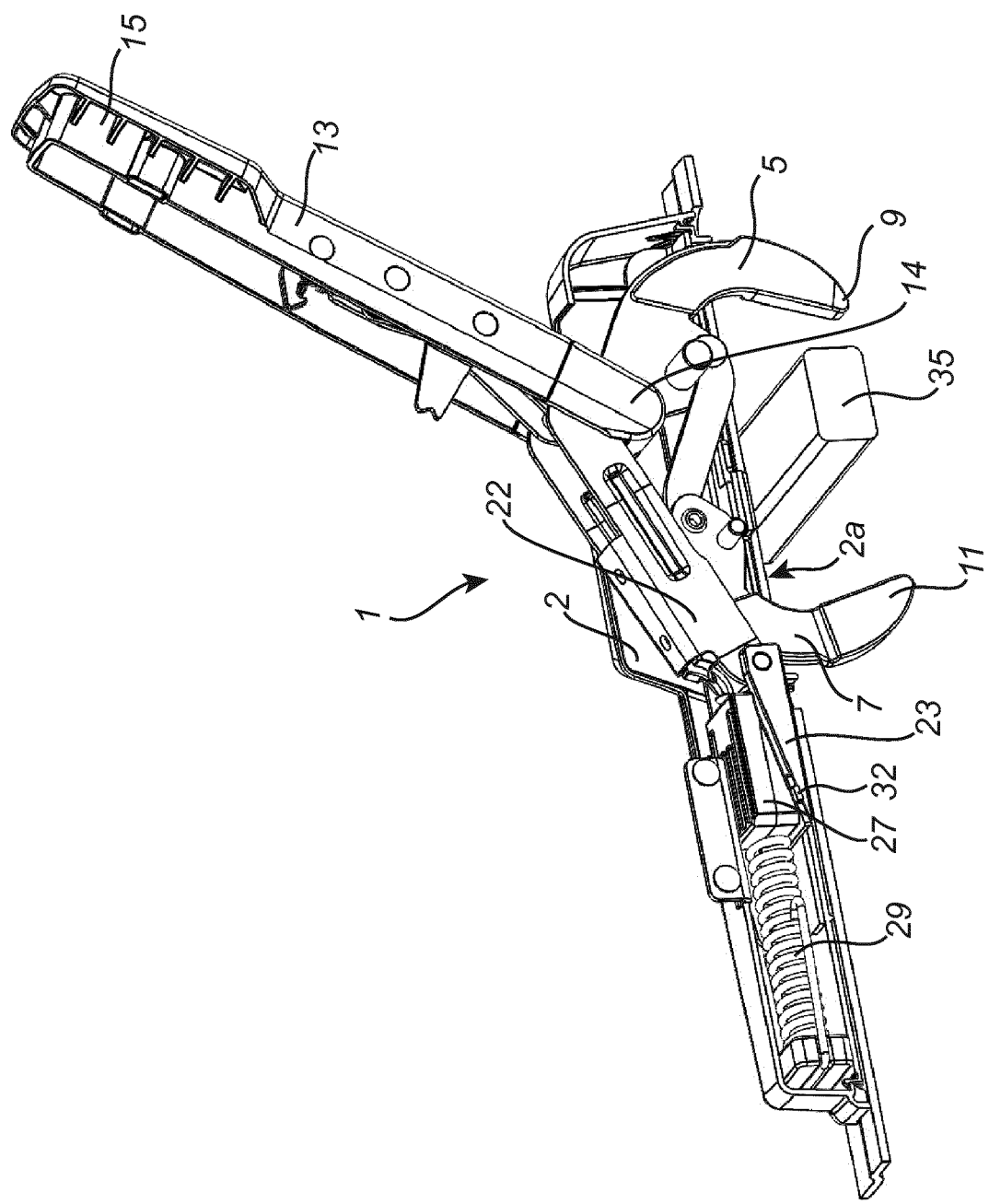
FIGS. 5*a-c* show perspective views of an attachment device according to the invention, with the attachment device gripping an alternative load carrying bar, the attachment device is illustrated in an open position, between an opened and a closed position and in a closed position.

FIG. 5a illustrates the attachment device 1 according to the present disclosure. The attachment device 1 includes a support housing 2 comprising a support surface 2a configured to face an elongate member 35, here a thinner load carrying bar. The attachment device 1 further includes a first and a second attachment member 5,7 pivotably connected to the support housing 2. The first and second attachment members 5,7 are configured for gripping and applying a clamping force to the elongate member 35.

An actuation member 13 is connected to the first moveable attachment member 5 and is configured to apply a closing force to the first attachment member 5. The actuation member 13 having a proximal end 14 and a distal end 15. The actuation member 13 is manoeuvrable from an open position to a closed position. In FIG. 5a the actuation member is illustrated in the fully open position.

Figure 5B:
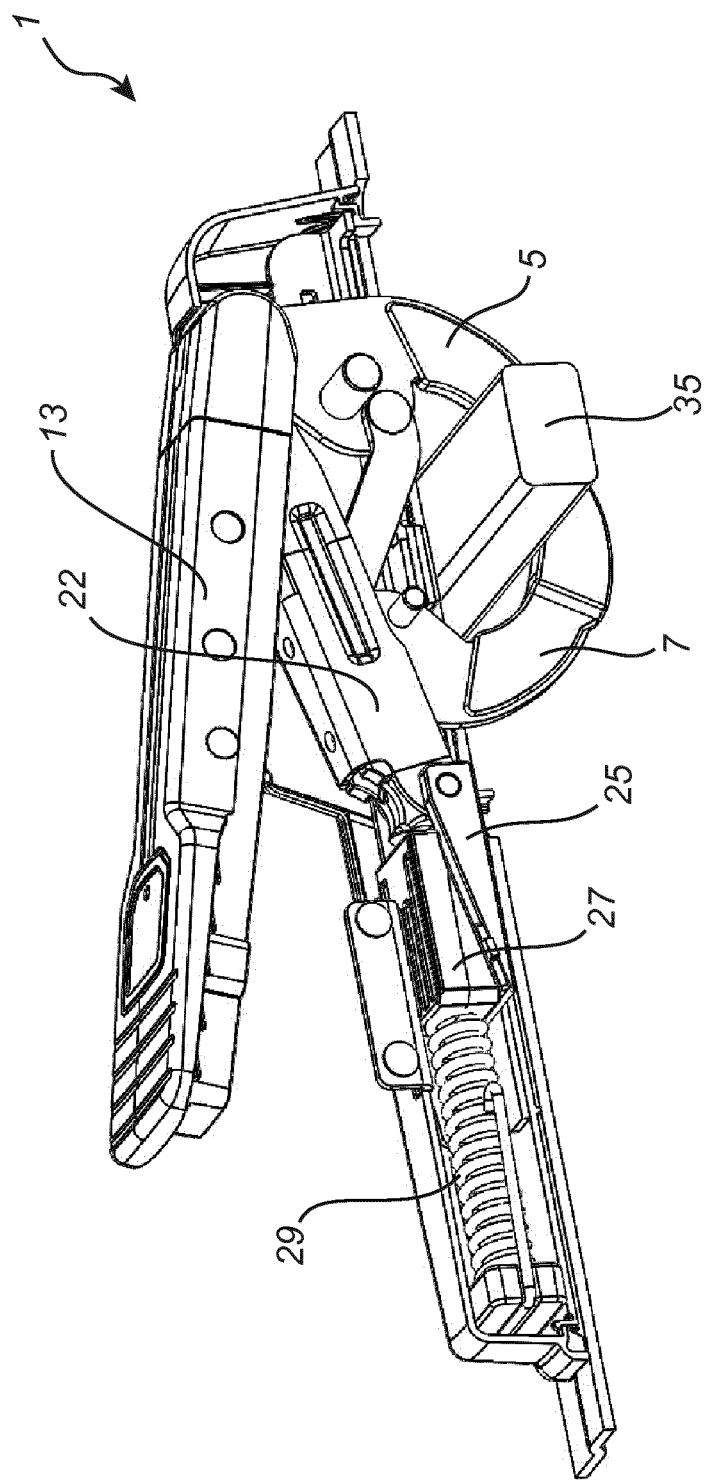

FIG. 5b illustrates the attachment device 1 according to FIG. 5b and with the elongate member 35. In FIG. 5b a closing force has been applied to the actuation member 13, and the actuation member 13 has been pushed down about halfway between an open position and a closed position.

Figure 5C:
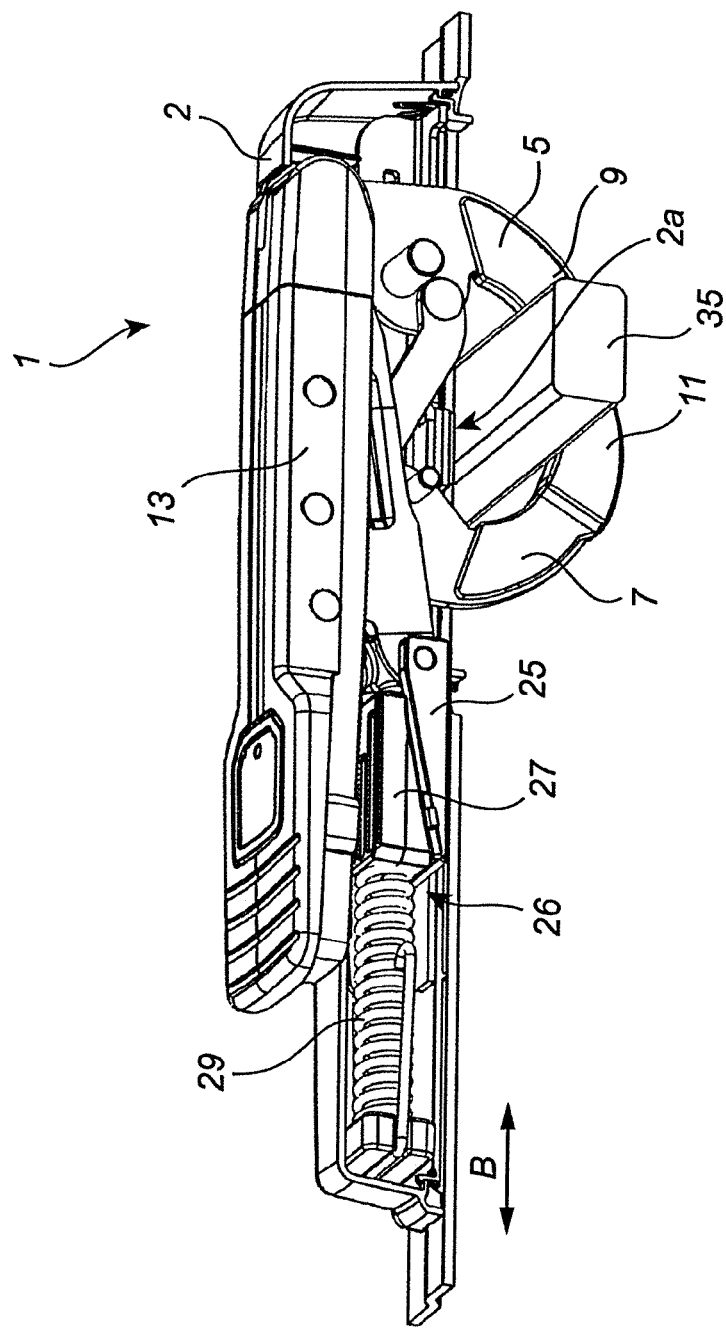

The fact that the load carrying bar 35 is thinner means that the first and the second attachment members 5,7 move closer together prior to encountering the load carrying bar positioned in the gap between the attachment members. So the closing force applied via the connector 22 towards the locking system 26 will thus be smaller than when the load carrying bar has greater dimension as illustrated in FIGS. 4b and 4c. When comparing the compression of the biasing member 29 and thus the accumulated closing force between the attachment device 1 when gripping and applying a clamping force to the elongate member 34 as illustrated in FIGS. 4b-c and when gripping and applying and clamping force to the elongate member 35 as illustrated in FIGS. 5b-c, the accumulated closing force is higher for the thicker elongate member 34, as illustrated in FIGS. 4b-c. Thus, the main movement of the actuation member 13 goes into closing the gap between the first and second attachment members 5,7 and the first and second wedge will slide a minimal distance and be locked into place by means of the stop element 32 arranged there between.

In FIG. 5C the handle 13 is in a closed position and the elongate member 35 is secured between the attachment members 5,7 and against the support surface 2a of the support housing 2 with the clamping force of the first and the second attachment members 5,7. The locking system 26 comprises auto-adjusting means for the clamping force applied to the elongate members and by the first and second attachment members 5,7 and are arranged to adjust the clamping force such that the clamping force is the same for elongate members having different thicknesses. Independent of the thickness of the elongate member, the first and second wedges 27,25 will be brought together at the same inclination of the actuation member 13, which angle is approximately 10-12 degrees as seen in a plane extending in the direction B. Thus, the closing force applied to the movable wedges 27,25 increases with the thickness of the elongate member and the locking system 26, more specifically the biasing member 29, thereby accumulates an increasing portion of the closing force and compensates for the increased closing force needed for a thicker elongate member and auto-adjusts the clamping force to remain constant irrespective of the thickness of the elongate member, within the range of motion of the first and the second attachment member 5,7.

The first and second attachment members 5,7 are connected to the housing 2 in parallel planes such that a respective grip end portion 9,11 of the first and second attachment members 5,7 overlap each other in a closed position, as seen from a direction perpendicular to direction B.

Figure 6A:
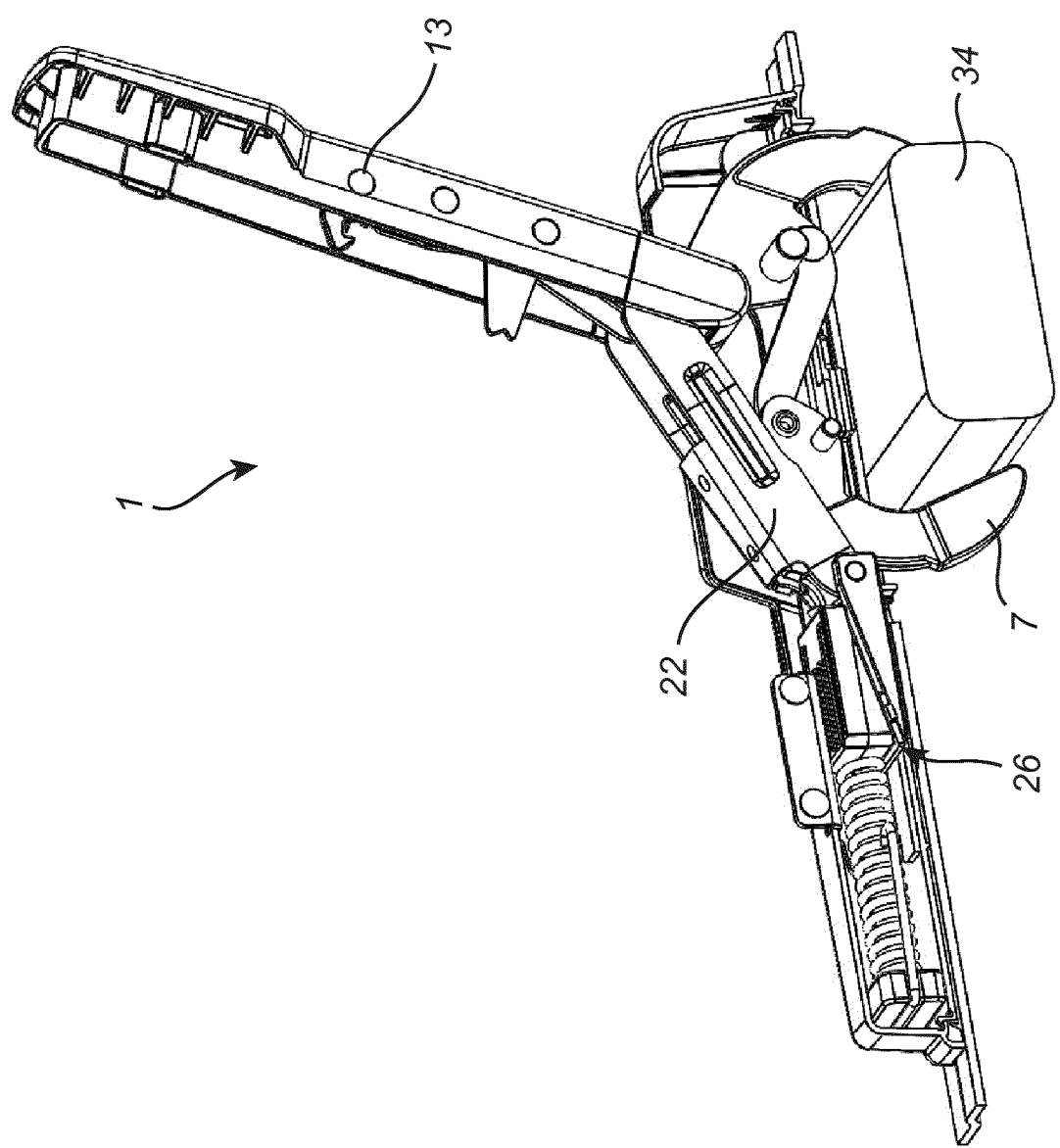
FIGS. 6*a-b* show perspective views of the attachment device with two load carrying bars of different thicknesses with the attachment members in contact with the load carrying bars.
Figure 6B:
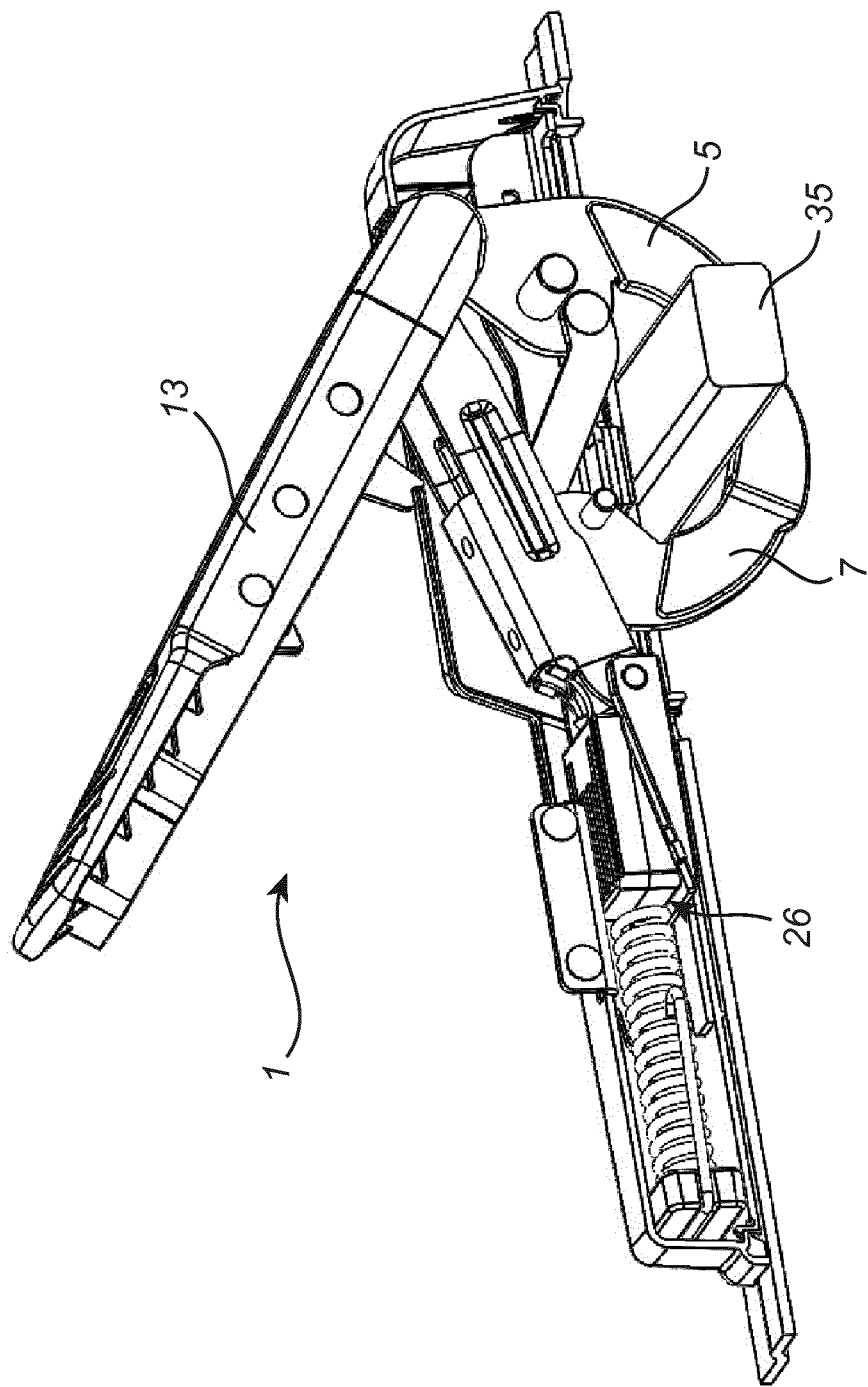

FIGS. 6a and 6b illustrate the attachment device 1 according to the present disclosure with the attachment members 5,7 in contact with the load carrying bar 34 and 35 respectively. FIG. 6a illustrates the attachment device 1 with the handle 13 in an almost fully open position with a larger load carrying bar 34 and the attachment members 5,7 being in contact with the crossbar load carrying bar 34. When using the attachment device 1 with a smaller load carrying bar 35, as illustrated in FIG. 6b, the handle needs to be pulled further down, compared to when gripping a thicker load carrying bar, prior to contact between the attachment members 5,7 and the load carrying bar 35. At the moment of contact the closing force is translated via the linkage 22 to the locking system 26 and a larger portion of the closing force when gripping and clamping a larger elongated member 34 is hence accumulated in the locking system 26, while the clamping is the same for elongate members 34,35 of different thicknesses.

Figure 7:
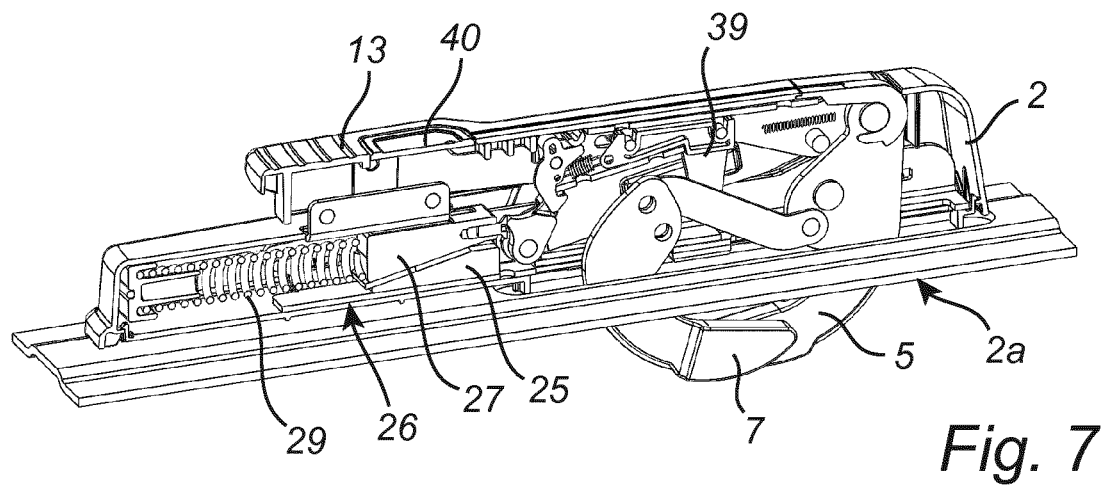
FIG. 7 shows a cross-sectional view of an attachment device according to the present invention.

FIG. 7 is a cross-sectional view of an attachment device 1 according to the present disclosure with an actuation member 13 in a closed position with a first and a second attachment member 5,7 in a closed position. As illustrated, the first and second attachment members 5,7 are connected to the housing 2 in parallel planes such that a respective grip end portion 9,11 of the first and second attachment members 5,7 overlap each other in a closed position, as seen from a direction perpendicular to direction B, allowing gripping and clamping of elongate members with a greater variety of thicknesses, such as thinner elongate members.

The lock mechanism 26 comprises a security mechanism 39 preventing the actuation member 13 to be moved to the closed position when the elongate member is acentric in relation to the first and the second attachment members 5,6. To prevent accidental opening of the actuation member 13, it is provided with a security engagement element 33 in the form of a hook. The security engagement element 33 engages a cooperating member in the housing 2, so that when the actuation member 13 is a closed position, the hook 33 secures the actuation member from unintentional opening. To release the lock element 33 the actuation member 13 is provided with a safety button 40.

The support surface 2a is a plane surface configured to rest against a load carrier surface, such as the floor of a roof box, and providing support for the load carrier attachment device 1. In a case with the load carrier surface is the floor of the roof box, the base of the roof box may be provided with openings in the floor allowing the downwardly extending first and second attachment members 5,7 protruding out from and through the support surface 2a to also extend and protrude out from the openings in the box allowing them to grip underlying and supporting load carrying bars for securing the roof box to the load carrying bars in a flexible and secure manner.

Figure 8:
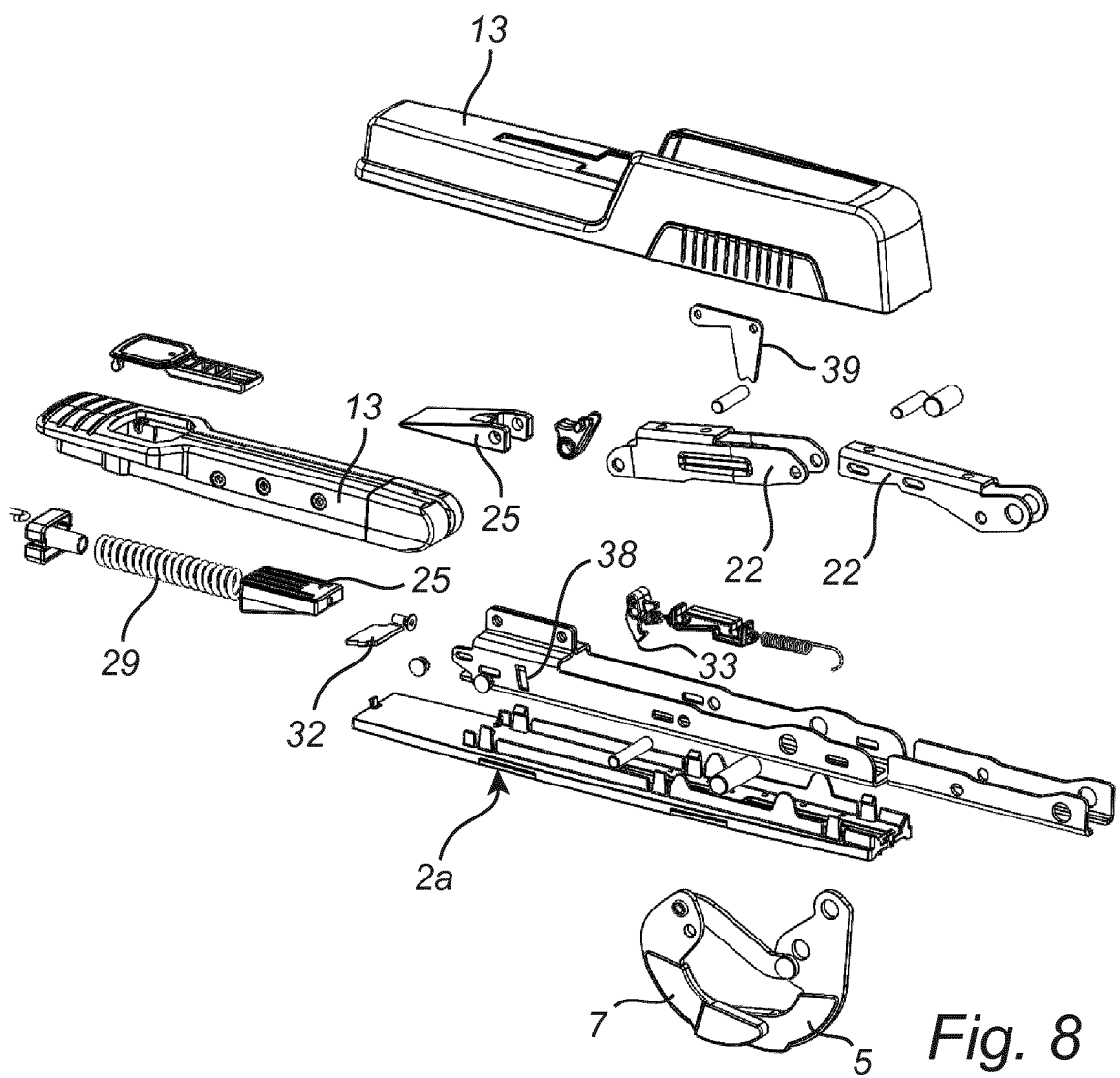
FIG. 8 illustrates an exploded view of the attachment device of FIG. 7.

FIG. 8 is an exploded view of the attachment member according to FIG. 7 wherein the individual components of the attachment device 1 are separated for illustrative purposes. The attachment device 1 includes the housing 2, the actuation member 13, the biasing member 29, the wedges 27,25, the stop member 32 arranged between the wedges 27,25 in the assembled attachment device 1. The housing 2 comprises a track 38 in which the stop element slides when manoeuvring the actuation member 13 between the open and closed position. The load carrier attachment device 1 is provided with a security engagement element 33, here in the form of a spring biased hook, arranged to engage with a cooperating member in the housing 2, so that when the actuation member 13 is in a closed position, the security engagement member 33 secures the actuation member 13 from unintentional opening.

The invention claimed is:

1. An attachment device for a load carrier, comprising:
   an elongate frame member comprising a load bearing surface configured to face an elongate member, wherein the elongate member is a cross bar of a roof rack;
   a first attachment member moveably connected to the elongate frame member and a second attachment member connected to the elongate frame member for applying a clamping force to the elongate member between the first attachment member and the second attachment member;
   an actuation member connected to at least the first moveable attachment member configured to apply a closing force to the first attachment member, wherein the actuation member is maneuverable from an open position to a closed position; and
   a locking system connected to at least one of the first moveable attachment member, the second attachment member, and the actuation member,
   wherein the locking system is configured to resiliently accumulate a portion of the closing force when the closing force applied to the actuation member, the first attachment member, or both, exceeds a predefined load, regardless of the size of the elongate member but within a range of motion of the first and second attachment members, during transition from an open state to a locked state.

2. The attachment device in accordance with claim 1, wherein the locking system comprises a linkage which is pivotally connected to a locking member at a first end and pivotally connected to the actuation member at a second end.

3. The attachment device in accordance with claim 1, wherein the locking system in one state is configured to transmit movement, force, or both, from the actuation member to the first attachment member in order to allow the first attachment member to move from its open position into direct or indirect contact with the load carrier.

4. The attachment device in accordance with claim 1, wherein the locking system in one state is configured to transmit movement, force, or both, from the actuation member to the locking system, while the first attachment member is stationary.

5. The attachment device in accordance with claim 1, wherein the locking system comprises a pair of slidable juxtaposed wedges configured to be expansible and contractible in a cavity.

6. The attachment device in accordance with claim 1, wherein the locking system comprises an expansible and contractible first locking member configured to be fixed relative to a second locking member when the locking system is in its locked state and be translatable relative to the second locking member when the locking system is in its open state.

7. The attachment device in accordance with claim 1, wherein the locking system is articulated, hinged, linked, or a combination thereof, to at least one of the first moveable attachment member, the second attachment member, and the actuation member.

8. The attachment device in accordance with claim 1, wherein the actuation member is pivotally connected to the first attachment member.

9. The attachment device in accordance with claim 1, wherein the first attachment member is pivotally connected to the second attachment member, wherein the pivotal connection is a linkage that is pivotally connected to the first attachment member and pivotally connected to the second attachment member.

10. The attachment device in accordance with claim 1, wherein the first attachment member is pivotable, translatable, or both, relative to a stationary part of the attachment device.

11. The attachment device in accordance with claim 1, wherein the second attachment member is fixed or moveable relative to a stationary part of the attachment device, and wherein the first moveable attachment member is pivotable, translatable, or both, relative to the stationary part of the attachment device.

12. The attachment device in accordance with claim 1, wherein the actuation member is pivotable, rotatable, or both, to apply the closing force to the attachment member.

13. The attachment device in accordance with claim 1, wherein the locking system is configured to fix the position of at least the first attachment member when the actuation member is in its closed position.

14. The attachment device in accordance with claim 1, wherein the clamping force applied to the first attachment member, the second attachment member, or both, around the elongate member is configured to be equal to or exceed a predetermined threshold when the locking system is in its locked state, and wherein any excess closing force that is not transferred to the first, or the second attachment member, or both, is resiliently accumulated in the locking system.

15. A load carrier, comprising:
an attachment device comprising:
an elongate frame member comprising a load bearing surface configured to face an elongate member, wherein the elongate member is a cross bar of a roof rack;
a first attachment member moveably connected to the elongate frame member and a second attachment member connected to the elongate frame member for applying a clamping force to the elongate member between the first attachment member and the second attachment member;
an actuation member connected to at least the first moveable attachment member configured to apply a closing force to the first attachment member, wherein the actuation member is maneuverable from an open position to a closed position; and
a locking system connected to at least one of the first attachment member, the second attachment member, and the actuation member,
wherein the locking system is configured to resiliently accumulate a portion of the closing force when the closing force applied to the actuation member, the first attachment member, or both, exceeds a predefined load, regardless of the size of the elongate member but within a range of motion of the first and second attachment members, during transition from an open state to a locked state, and
wherein the load carrier is a roof box, a bike carrier, a ski, a snowboard carrier, a roof basket, or other type of load carrier configured to be attached to a vehicle.

16. An attachment device for a load carrier, comprising:
a housing comprising a load bearing surface configured to face an elongate member, wherein the elongate member is a cross bar of a roof rack;
a first attachment member moveably connected to the housing and a second attachment member connected to the housing for applying a clamping force to the elongate member between the first attachment member and the second attachment member;
an actuation member connected to at least the first moveable attachment member configured to apply a closing force to the first attachment member, wherein the actuation member is maneuverable from an open position to a closed position; and
a locking system connected to at least one of the first attachment member, the second attachment member, and the actuation member,
wherein the locking system is configured to resiliently accumulate a portion of the closing force when the closing force applied to the actuation member exceeds a predefined load, regardless of the size of the elongate member but within a range of motion of the first attachment member, during transition from an open state to a locked state, and
wherein the locking system comprises a pair of slidable juxtaposed wedges configured to be expansible and contractible in a cavity.

17. An attachment device for a vehicle roof rack load carrier, comprising:
an elongate frame member having a surface configured to face an elongate cross bar of the vehicle roof rack;
a first attachment member moveably coupled to the elongate frame member and configured to contact the cross bar;
a second attachment member coupled to the elongate frame member and configured to contact the cross bar, wherein the cross bar is disposed between the first attachment member and the second attachment member in an attachment position; and
an actuation member configured to be coupled to at least the first attachment member and to move the first attachment member to the attachment position,
wherein the actuation member is configured to be directly coupled to at least the first attachment member.

18. The attachment device of claim 17, further comprising a force transfer member coupled to at least one of the first attachment member, the second attachment member, and the actuation member,
wherein the force transfer member is configured to transfer a closing force from the actuation member to the first attachment member to move the first attachment member to the attachment position.

19. The attachment device of claim 18, wherein the force transfer member is configured to retract to transfer the closing force.

20. The attachment device of claim 17, further comprising a locking system connected to the first attachment member, the actuation member, or both, wherein the locking system is configured to resiliently accumulate a portion of a closing force when the closing force applied to the first attachment member, the actuation member, or both, exceeds a predefined load, regardless of the size of the elongate member but within a range of motion of the first attachment member, during transition from an open state to a locked state.

* * * * *

UNITED STATES PATENT AND TRADEMARK OFFICE
CERTIFICATE OF CORRECTION

PATENT NO. : 11,097,664 B2
APPLICATION NO. : 17/042683
DATED : August 24, 2021
INVENTOR(S) : Joachim Vidar Page 1 of 1

It is certified that error appears in the above-identified patent and that said Letters Patent is hereby corrected as shown below:

In the Claims

In Column 15, Claim 1, Lines 55-56, delete "first moveable attachment member" and insert -- first attachment member --, therefor.
In Column 15, Claim 1, Lines 60-61, delete "first moveable attachment member" and insert -- first attachment member --, therefor.
In Column 16, Claim 3, Line 13, delete "its" and insert -- the --, therefor.
In Column 16, Claim 6, Line 28, delete "its" and insert -- the --, therefor.
In Column 16, Claim 6, Line 29, delete "its" and insert -- the --, therefor.
In Column 16, Claim 7, Lines 33-34, delete "first moveable attachment member" and insert -- first attachment member --, therefor.
In Column 16, Claim 11, Line 52, delete "first moveable attachment member" and insert -- first attachment member --, therefor.
In Column 16, Claim 13, Line 61, delete "its" and insert -- the --, therefor.
In Column 16, Claim 14, Line 66, delete "its" and insert -- the --, therefor.
In Column 17, Claim 15, Lines 15-16, delete "first moveable attachment member" and insert -- first attachment member --, therefor.
In Column 17, Claim 16, Lines 39-42, delete "and a second attachment member connected to the housing for applying a clamping force to the elongate member between the first attachment member and the second attachment member".
In Column 17, Claim 16, Lines 43-44, delete "first moveable attachment member" and insert -- first attachment member and --, therefor.
In Column 17, Claim 16, Line 48, delete ", the second attachment member,".

Signed and Sealed this
Nineteenth Day of October, 2021

Drew Hirshfeld
*Performing the Functions and Duties of the*
*Under Secretary of Commerce for Intellectual Property and*
*Director of the United States Patent and Trademark Office*